United States Patent [19]

Baas

[11] Patent Number: 5,134,603
[45] Date of Patent: Jul. 28, 1992

[54] INSERTION/REMOVAL ARRANGEMENT FOR A RECORDING CARRIER

[75] Inventor: Dieter Baas, Kehl, Fed. Rep. of Germany

[73] Assignee: Deutsche Thomson-Brandt GmbH, Villingen-Schwenningen, Fed. Rep. of Germany

[21] Appl. No.: 250,727

[22] Filed: Sep. 28, 1988

[30] Foreign Application Priority Data

Sep. 30, 1987 [DE] Fed. Rep. of Germany ....... 3732940

[51] Int. Cl.$^5$ ..................... G11B 17/04; G11B 17/03
[52] U.S. Cl. .................................. 369/75.2; 369/77.1
[58] Field of Search ....................... 369/291, 289, 77.1, 369/77.2, 75.2

[56] References Cited

U.S. PATENT DOCUMENTS

| | | | |
|---|---|---|---|
| 4,617,655 | 10/1986 | Aldenhoven | 369/291 |
| 4,743,986 | 5/1988 | Klös-Hein | 360/96.5 |
| 4,817,079 | 3/1989 | Covington | 369/291 |
| 4,823,214 | 4/1989 | Davis | 369/291 X |
| 4,862,445 | 8/1989 | Sasaki | 369/75.2 |

FOREIGN PATENT DOCUMENTS 61-162861  7/1986  Japan .................................. 369/77.1

*Primary Examiner*—John W. Shepperd
*Attorney, Agent, or Firm*—Max Fogiel

[57] ABSTRACT

An arrangement for inserting and extracting a recorded medium in which a movable slidable member is slidable in directions into and out of said stationary housing member. The slidable member is provided with two nose-shaped elements that are spaced from one another. A single switch mounted on the stationary housing member is actuated by the nose-shaped elements when the slidable member moves in-and-out of the stationary housing member. The in-and-out motion of the slidable member is made dependent on the states of the single switch.

5 Claims, 3 Drawing Sheets

INSERTION/REMOVAL ARRANGEMENT FOR A RECORDING CARRIER

DEVICE FOR INSERTING AND EXTRACTING A RECORDED MEDIUM

The invention concerns a device for inserting and extracting a recorded medium with a stationary part and a slide-out part.

Insertion-and-extraction devices of this type are associated for example with compact-disk players into which a cassette containing a compact disk, a "cartridge," can be inserted into. The device automatically inserts the cassette and, once the compact disk has played, extracts it again. Controlling the automatic insertion and extraction of the cassette with a light barrier that measures the path traveled during insertion and extraction is known. The light barrier, however, makes this approach complicated and expensive.

The object of the invention is accordingly to provide an insertion-and-extraction device that will ensure reliable operation by simple means and without great engineering expenditure.

This object is attained by means of two noses on the slide-out part that activate a switch on the stationary part and in that the in-and-out motion of the slide-out part is governed in accordance with the state of the switch.

In the drawing,

FIG. 2 illustrates the same embodiment while the slide-out part is traveling in.

The invention will now be described and explicated with reference to FIGS. 1 through 4.

FIGS. 1 through 4 show the stationary part 1 and the slide-out part 2 of a device for inserting and removing a recorded medium. Mounted on one side of slide-out part 2 are two noses 3 and 4 that activate a switch 5, which can, as will be evident from the figures, be a simple and inexpensive to manufacture spring contact.

Figure 1:
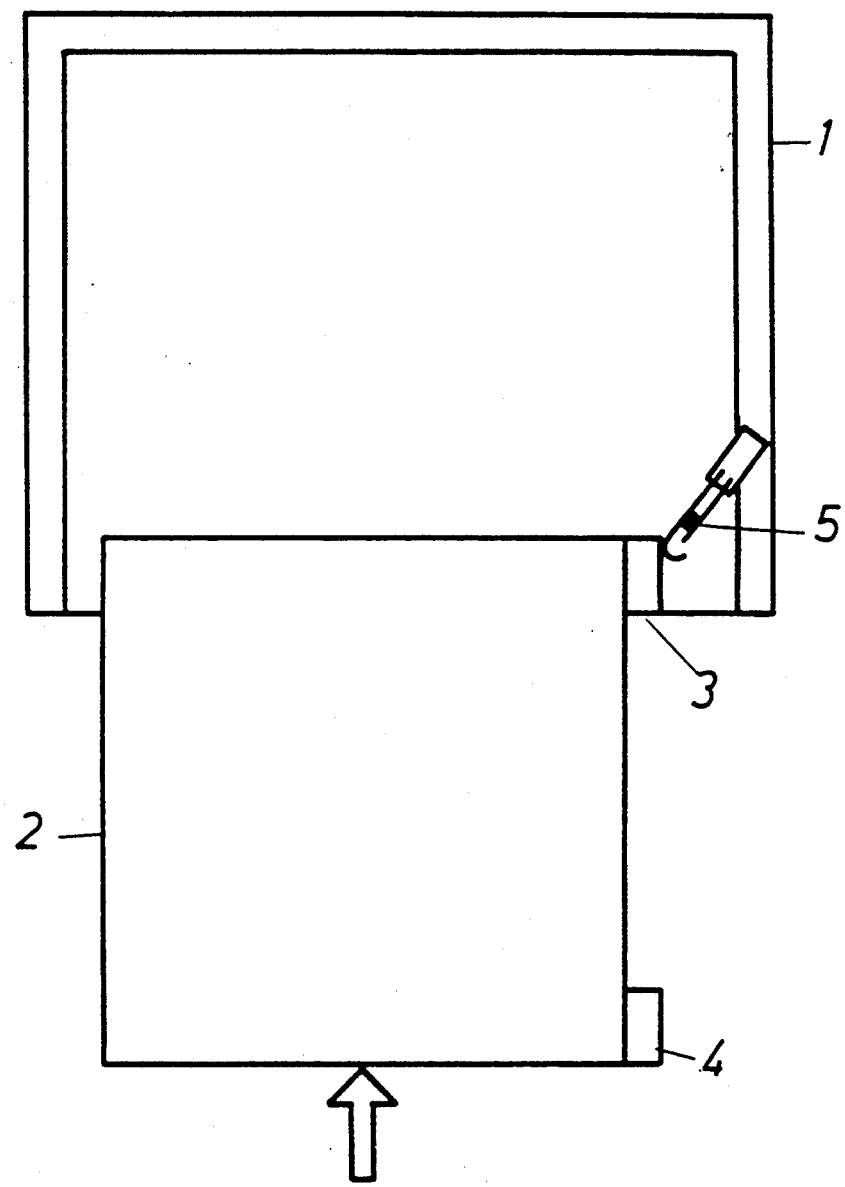
FIG. 1 illustrates one embodiment of the invention with the slide-out part out.
Figure 2:
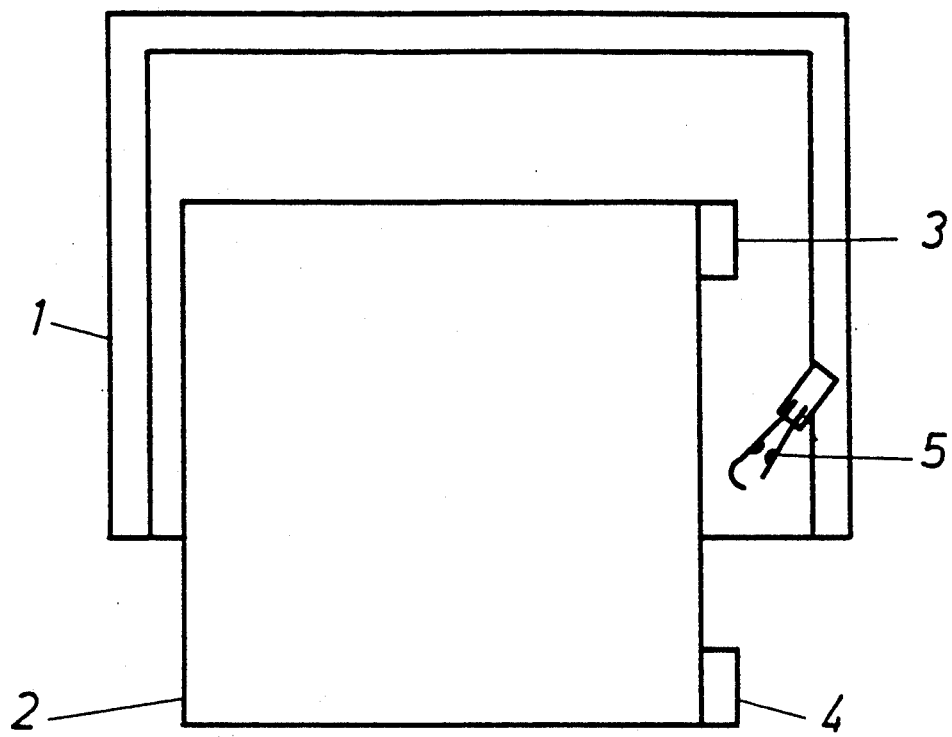

When slide-out part 2 is out, as shown in FIG. 1, nose 3 keeps switch 5 closed. Manually pushing slide-out part 2 in will release nose 3 from switch 5, which accordingly opens. As soon as switch 5 opens, slide-out part 2 is automatically retracted and simultaneously lowered to bring the inserted cassette into contact with the mechanism that drives the compact disk. This phase of retraction is represented in FIG. 2.

Figure 3:
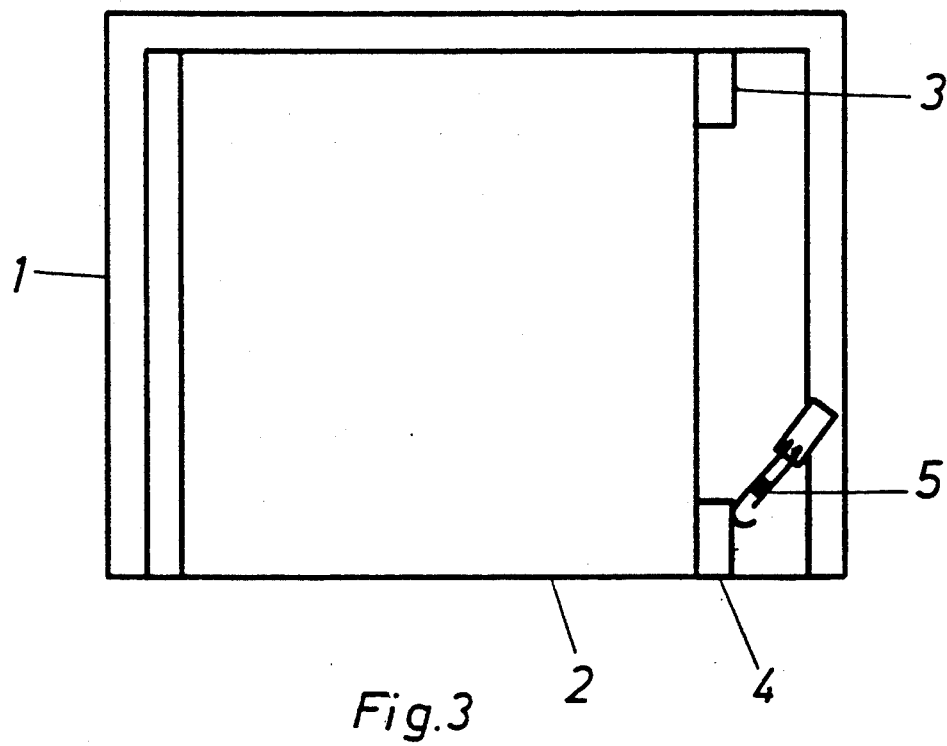
FIG. 3 shows when the slide-out part is in its innermost position.

Slide-out part 2 is now retracted farther until the other nose, nose 4, closes switch 5. This phase of retraction is represented in FIG. 3.

Figure 4:
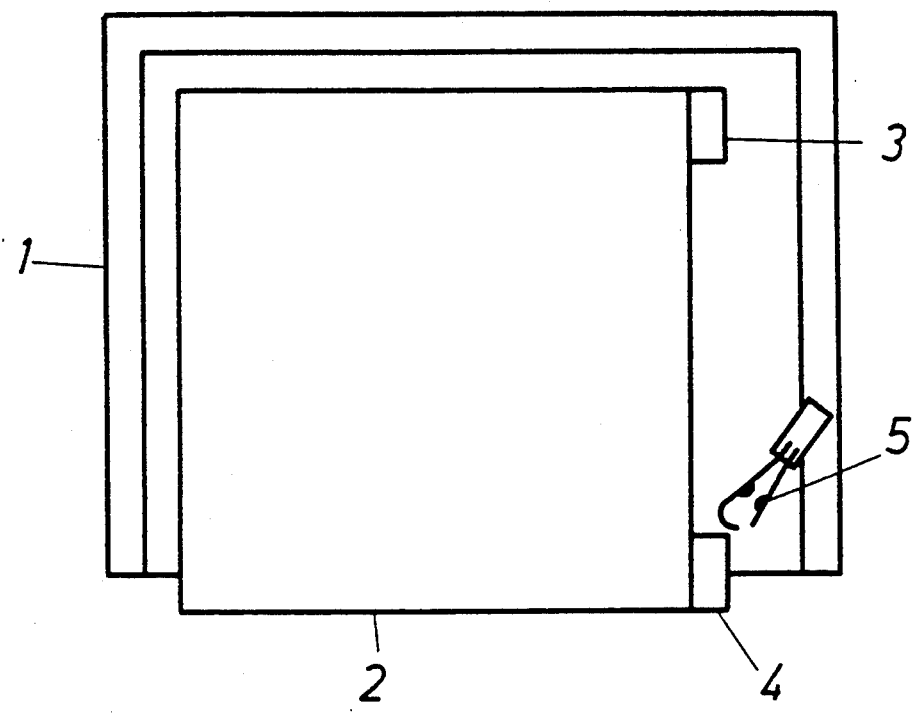
FIG. 4 shows when the slide-out part is located just before it assumes its innermost position.

Slide-out part 2 is now extended until second nose 4 releases switch 5 and accordingly opens it. During this phase, which is represented in FIG. 4, the compact disk is being played.

When the listener decides to insert another disk, slide-out part 2 is extended out until first nose 3 closes switch 5.

Since the particular phase that slide-out part 2 is in is easily determined from the state of switch 5, the insertion and extraction of a cassette with a compact disk in it can easily be controlled by a microprocessor. Such costly components as photodiodes and photosensors for a light barrier and their current supply are unnecessary, and their function is carried out by a simple and inexpensive to manufacture switch in the form of a spring contact.

I claim:

1. An arrangement for inserting and extracting a recorded medium, comprising: a stationary housing member; a movable slidable member that is slidable in directions into and out of said stationary housing member; two nose-shaped elements on said slidable member and spaced from one another; single switch means mounted on said stationary housing member and actuated by said nose-shaped elements when moving with said slidable member into and out of said housing member; in-and-out motion of said slidable member being dependent on states of said switch means, a first one of said nose elements maintaining said switch means in a first state while said slidable member is out of said stationary housing member, said first nose element releasing said switch means and shifting said switch means into a second state when said slidable member is forced manually into said stationary housing member to a predetermined extent, said slidable member being thereafter retracted until the second nose-shaped element shifts said switch means back into said first state of said switch means, said slidable member being thereafter extended until the second nose-shaped element releases said switch means and shifts said switch means back into said second state, said slidable member moving out of said housing member sufficiently far when extended outward for the first nose-shaped element to shift said switch means into said first state.

2. An arrangement as defined in claim 1, wherein said switch means is closed in said first state, said switch means being open in said second state.

3. An arrangement as defined in claim 1, wherein the state of said switch means is processed by a microprocessor controlling in-and-out motion of said slidable member.

4. An arrangement as defined in claim 1, wherein said slidable member is raised to a predetermined level while being extended for separating said recording medium from means driving said recorded medium, said slidable member being lowered to an equal extent while being retracted for bringing said recorded medium into contact with said means for driving said recorded medium.

5. An arrangement for inserting and extracting a recorded medium, comprising: a stationary housing member; a movable slidable member that is slidable in directions into and out of said stationary housing member; two nose-shaped elements on said slidable member and spaced from one another; single switch means mounted on said stationary housing member and actuated by said nose-shaped elements when moving with said slidable member into and out of said housing member; in-and-out motion of said slidable member being dependent on states of said switch means; a first one of said nose-shaped elements maintaining said switch means in a first state while said slidable member is out of said housing member, said first nose-shaped element releasing said switch means and shifting said switch means into a second state when said slidable member is forced manually into said housing member to a predetermined extent, said slidable member being thereafter retracted until the second nose-shaped element shifts said switch means back into said first state, said slidable member being thereafter extended until the second nose-shaped element releases said switch means and shifts said switch means back into said second state, said slidable member moving out of said housing member far enough when extended for said first nose-shaped element to shift said switch means into said first state; said switch means being closed in said first state and being open in said second state; said slidable member being raised to a predetermined level while being extended to separate said recorded medium from means driving said recorded medium, said slidable member being lowered to an equal extent while being retracted to bring said recorded medium into contact with said means for driving said recorded medium; the state of said switch means being processed by a microprocessor controlling in-and-out motion of said slidable member.

* * * * *